(12) United States Patent
Sugita et al.

(10) Patent No.: US 12,463,398 B2
(45) Date of Patent: Nov. 4, 2025

(54) LIGHT SOURCE DEVICE

(71) Applicant: Panasonic Intellectual Property Management Co., Ltd., Osaka (JP)

(72) Inventors: Tomoya Sugita, Nara (JP); Ryo Haseyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 786 days.

(21) Appl. No.: 17/754,794

(22) PCT Filed: Jul. 21, 2020

(86) PCT No.: PCT/JP2020/028215
§ 371 (c)(1),
(2) Date: Apr. 12, 2022

(87) PCT Pub. No.: WO2021/117286
PCT Pub. Date: Jun. 17, 2021

(65) Prior Publication Data
US 2023/0335971 A1   Oct. 19, 2023

(30) Foreign Application Priority Data
Dec. 9, 2019  (JP) ................... 2019-221829

(51) Int. Cl.
*H01S 5/02253* (2021.01)
*G02B 19/00* (2006.01)
*H01S 5/40* (2006.01)

(52) U.S. Cl.
CPC ........ *H01S 5/02253* (2021.01); *H01S 5/4075* (2013.01)

(58) Field of Classification Search
CPC ............... H01S 5/02253; H01S 5/4075; H01S 2301/206; H01S 5/423; G02B 3/0068;
(Continued)

(56) References Cited

U.S. PATENT DOCUMENTS

2009/0059177 A1 * 3/2009 Okuda ................. G03B 21/208
353/38
2012/0127723 A1 * 5/2012 Mikhailov ......... G02B 27/0966
359/621

(Continued)

FOREIGN PATENT DOCUMENTS

| CN | 203298189 U | 11/2013 |
| JP | 2009-063619 | 3/2009 |
| JP | 2017-168547 | 9/2017 |

OTHER PUBLICATIONS

English Translation of Chinese Office Action dated Dec. 20, 2023 for the related Chinese Patent Application No. 202080078936.X.
(Continued)

*Primary Examiner* — Xinning(Tom) Niu
(74) *Attorney, Agent, or Firm* — Rimon P.C.

(57) ABSTRACT

The light source device according to the present disclosure includes a light source, a light transmission part, a light intensity converter, and a collimator. The light source includes a plurality of semiconductor laser elements. The collimator includes a first lens array that has a plurality of collimator lenses. Each collimator lens collimates laser light emitted from a single semiconductor laser element. The light intensity converter includes a second lens array that has a plurality of lens arrays. Each lens array includes a plurality of lens cells so as to uniformize a light intensity distribution of the laser beam emitted from the single semiconductor laser element. The light intensity converter is disposed on a main surface of the light transmission part on the light source side. The collimator is disposed on a surface of the light transmission part opposite to the light source side.

6 Claims, 9 Drawing Sheets

(58) Field of Classification Search
CPC .......... G02B 19/0014; G02B 19/0057; G03B 21/2013; G03B 21/2033; G03B 21/204
See application file for complete search history.

(56) References Cited

U.S. PATENT DOCUMENTS

2015/0380894 A1* 12/2015 Yoshino ............... H01S 5/0071
   359/641
2019/0203908 A1*  7/2019 Kiyota ................. H01S 5/0071

OTHER PUBLICATIONS

International Search Report of PCT application No. PCT/JP2020/028215 dated Oct. 20, 2020.

* cited by examiner

LIGHT SOURCE DEVICE

FIELD OF THE INVENTION

The present disclosure relates to a light source device including a lens array that collimates beams emitted from a plurality of semiconductor laser elements.

DESCRIPTION OF THE RELATED ART

Conventionally, a high-pressure mercury lamp or the like is used as a light source for a projector (image projection device). In recent years, a high-pressure mercury lamp or the like, which has been typically a mainstream, are increasingly being replaced with a semiconductor laser (laser diode (hereinafter referred to as LD)) in order to respond to high luminance and energy saving of a projector.

Projectors using semiconductor lasers as light sources are roughly classified into a type that uses laser light of a plurality of wavelengths corresponding to three primary colors of red (R), green (G), and blue (B), and a type that obtains white light by inputting blue laser light into a phosphor as excitation light (pump light) and converting the blue laser light into fluorescent light in a yellow wavelength band. Both types of projectors illuminate an image display with laser light or fluorescent light having high light intensity, and enlarge and project image information formed in the image display on a screen by a projection optical system or the like, and thus can be used as a bright and large-screen image display device.

A multi-chip package (flat package) in which a plurality of LD chips is arranged in parallel has been proposed in, for example, PTL 1 and put into practical use by technological innovation aiming at miniaturization, high luminance, and low price of a light source unit. With the advent of such a product, a product in which, in order to collimate laser light emitted from the LD chips arranged in the multi-chip package, a plurality of lenses is arranged corresponding to the plurality of LD chips, respectively, has been put into practical use. In particular, a configuration called a lens array in which a plurality of lenses is integrally provided has been proposed, and it is predicted that many projector products adopt this type of laser light source in the future.

In a case where white light is obtained by inputting blue laser light of a plurality of beams into a phosphor as excitation light and converting the blue laser light into fluorescent light as described above, it is preferable to condense the laser light on a region as small as possible using a lens or the like and irradiate the region with the laser light. However, there may be a problem that luminance saturation of the phosphor (a decrease in luminous efficiency due to an increase in temperature of the phosphor or the like caused by an increase in intensity of excitation light) occurs, or a problem that the lifetime of the phosphor decreases. Therefore, the light intensity cannot be excessively increased. In particular, the intensity distribution of laser light emitted from LDs generally has a so-called Gaussian beam profile in which the central portion is high and the peripheral portion is low. Therefore, there are a high portion and a low portion in the light intensity distribution in the vicinity of an incident surface of the phosphor. In a portion where the light intensity is high, the conversion efficiency from the excitation light (incident light) to fluorescent light is saturated or the phosphor burns. On the other hand, in a portion where the light intensity is low, there arises a problem that sufficient fluorescent light (converted light) cannot be obtained, resulting in causing illuminance unevenness.

On the other hand, in order to minimize the size of an optical system and a projector, it is necessary to increase the luminance while minimizing a region irradiated with laser light (fluorescent light emission region). Therefore, if the intensity distribution of the laser light, which is excitation light, can be uniformized as much as possible, and the laser light can be uniformly excited with an intensity in which the peak intensity of light emitted to the fluorescent light emission region does not cause luminance saturation, the entire region irradiated with excitation light can be a fluorescent light emission region with high luminance.

PTL 2 proposes, as a configuration in which laser light of a plurality of beams is used as illumination light of a projector or excitation light to a phosphor, a configuration in which a pair of optical elements called fly-eye lenses is used to uniformize a light intensity distribution, each of the optical elements including lens cells that are arranged in a two-dimensional array.

CITATION LIST

Patent Literature

PTL 1: Unexamined Japanese Patent Publication No. 2017-168547

PTL 2: Unexamined Japanese Patent Publication No. 2009-63619

SUMMARY OF THE INVENTION

However, this configuration needs to accurately align the distance between the two fly-eye lenses and the positions of the plurality of lens cells constituting the fly-eye lenses, and thus has a problem of an increase in size of an optical system for obtaining collimated light having a uniform light intensity distribution.

In order to address the above-mentioned problem, an object of the present disclosure is to reduce a size of an optical system in a light source device that converts a plurality of laser beams emitted from a multi-chip package light source in which a plurality of LD chips is arranged in parallel into a plurality of collimated beams having a uniform light intensity distribution (so-called flat-top light intensity distribution). Note that the optical system refers to a set of optical elements through which laser light emitted from the light source passes until an object is irradiated with the laser light.

In order to achieve the above object, a light source device according to the present disclosure has the following configuration.

That is, the light source device according to the present disclosure includes a light source and an optical element. The light source emits laser light. The optical element is disposed in an emission direction of the laser light. The light source includes a plurality of semiconductor laser elements. Each of the plurality of semiconductor laser elements emits laser light. The optical element has a first surface and a second surface. The first surface includes a light intensity converter. The laser light enters the light intensity converter. A light transmission part is provided between the first surface and the second surface. The laser light is transmitted through the light transmission part. The second surface has a collimator. The laser light having transmitted through the light intensity converter is emitted to the collimator. The light intensity converter includes a plurality of lens arrays. The collimator includes a plurality of collimator lenses. The laser light emitted from a predetermined one semiconductor laser element among the plurality of semiconductor laser elements enters a predetermined one lens array among the plurality of lens arrays. The laser light entering the predetermined one lens array is transmitted through a predetermined one collimator lens among the plurality of collimator lenses and emitted. Each of the plurality of lens arrays has a plurality of lens cells. The laser light is transmitted through at least two lens cells among the plurality of lens cells included in the predetermined one lens array. The laser light transmitted through the at least two lens cells has a uniform light intensity distribution. The laser light has a parallel light flux after passing through the predetermined one collimator lens.

According to the present disclosure, the size of the optical system of the light source device that emits a plurality of collimated light beams having a uniform light intensity distribution can be reduced.

BRIEF DESCRIPTION OF THE DRAWINGS

FIG. 4 is a cross-sectional view of the light source device taken along a plane passing through the center of one collimator lens 4a.

DETAILED DESCRIPTION OF THE PREFERRED EMBODIMENTS

A light source device according to an exemplary embodiment of the present disclosure will be described below with reference to the drawings. Note that the light source device and a method for manufacturing the light source device described below are merely examples, and are not limited to the following descriptions.

Figure 1:
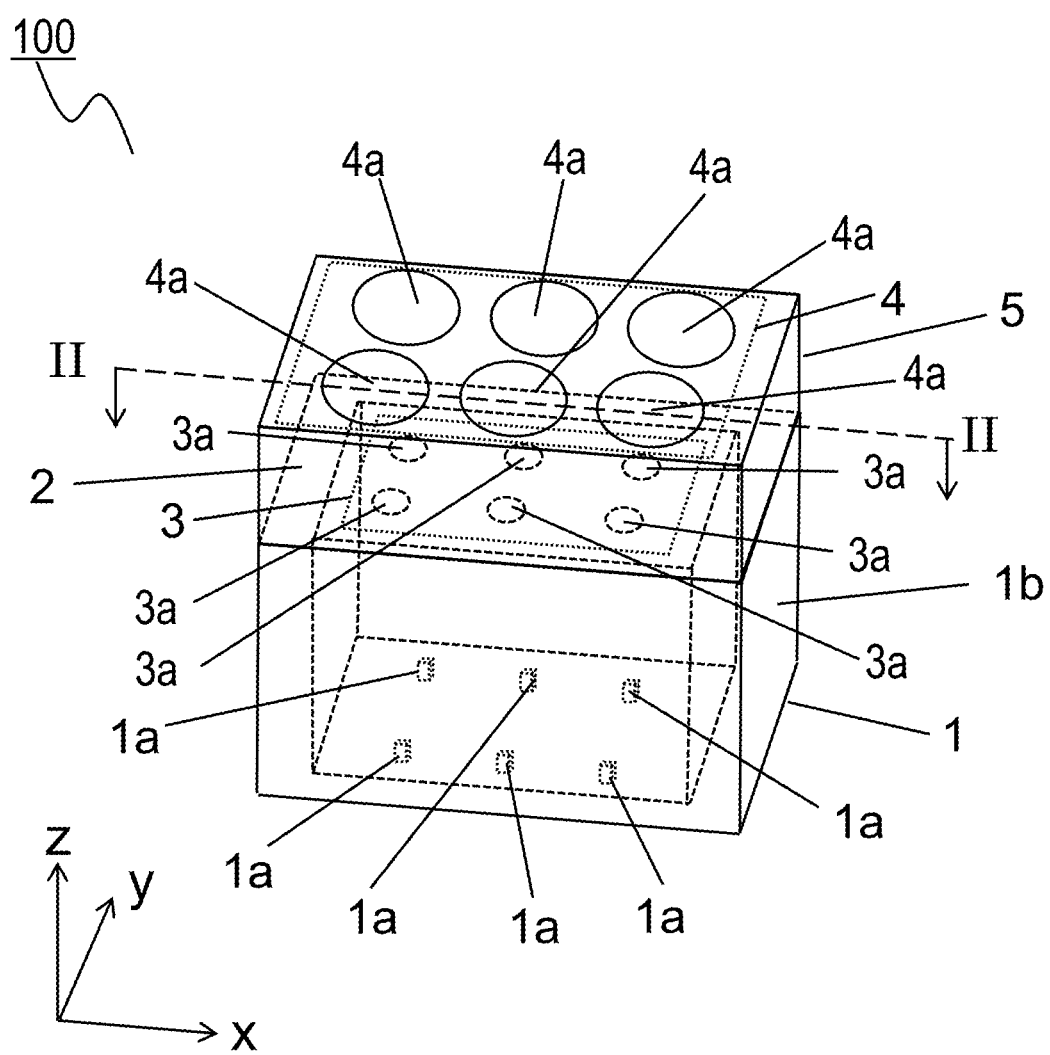
FIG. 1 is a schematic diagram illustrating a light source device according to one exemplary embodiment of the present disclosure.
Figure 2:
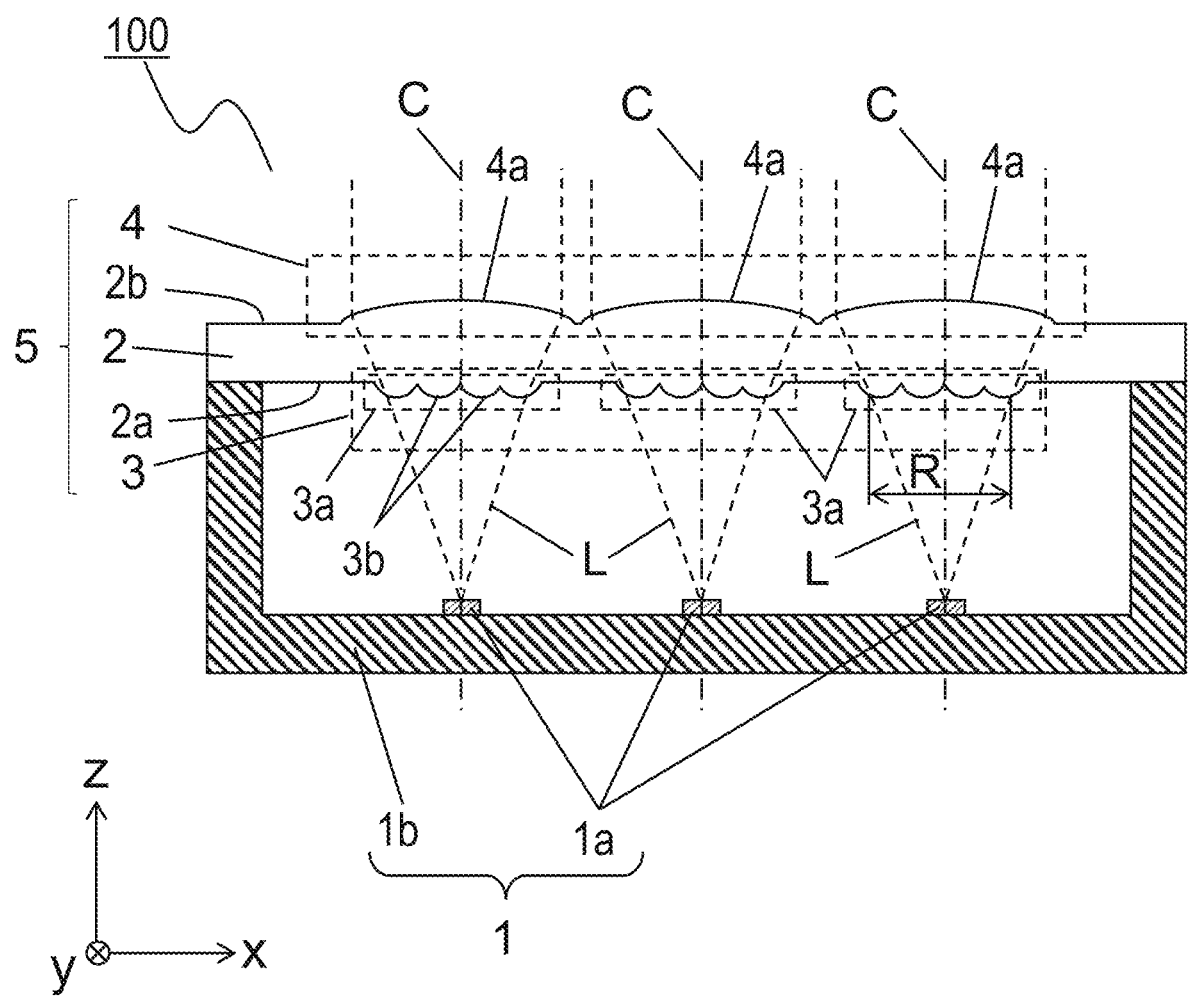
FIG. 2 is a cross-sectional view of the light source device taken along a plane passing through the center of a collimator lens.
Figure 3:
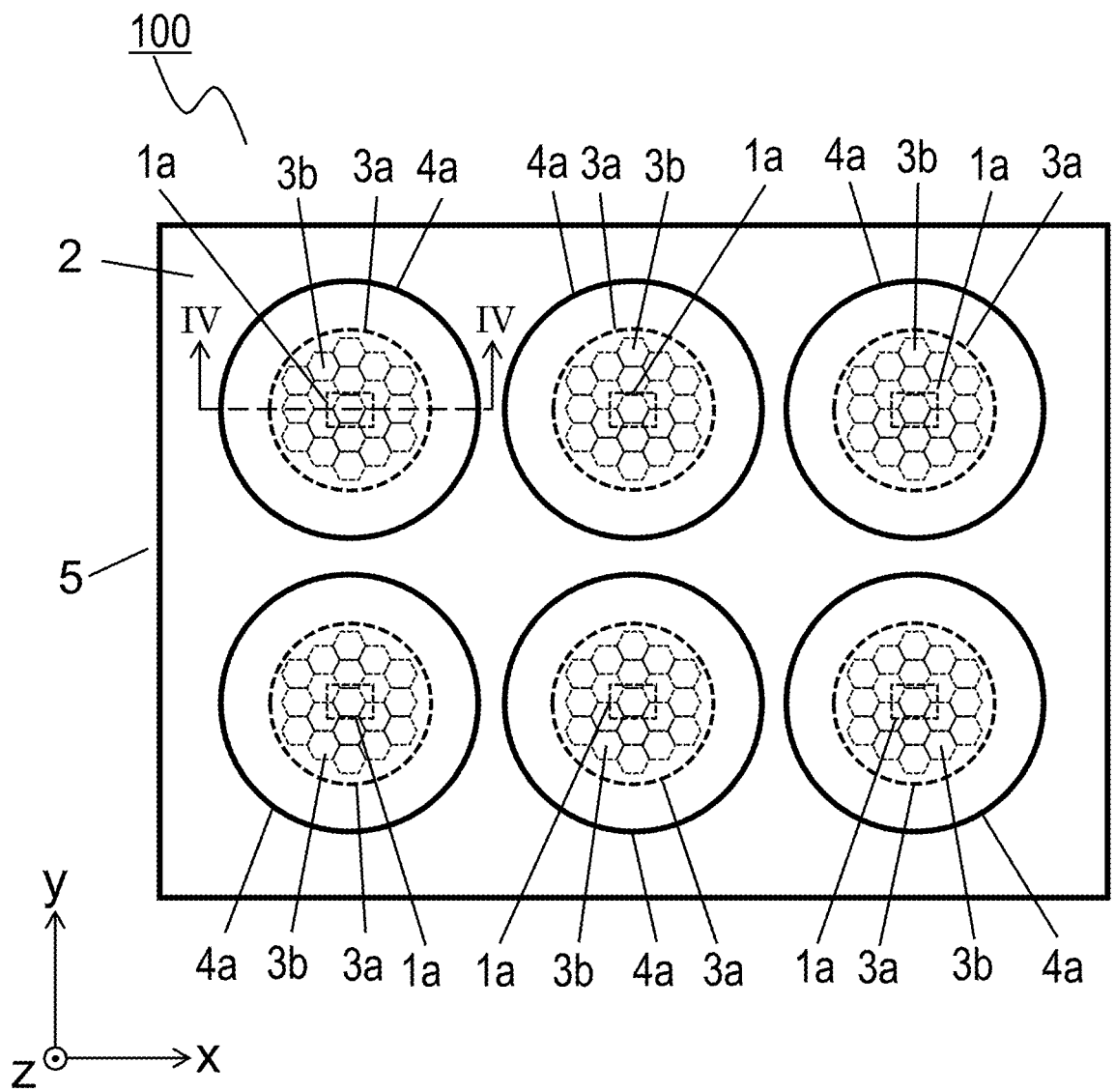
FIG. 3 is a plan view of the light source device as viewed from above at a position on a line passing through the center of an optical element.

FIG. 1 is a schematic diagram illustrating light source device 100 according to one exemplary embodiment. FIG. 2 is a cross-sectional view of light source device 100 illustrated in FIG. 1 taken along a plane parallel to an xz plane including line II-II passing through the center of collimator lens 4a and parallel to an x axis. FIG. 3 is a plan view of light source device 100 illustrated in FIG. 1 as viewed from above. Note that the wording "viewed from above" means being viewed from a position on a straight line parallel to a z axis and passing through the center of optical element 5, the position having a z value that is larger than z values at any position of optical element 5 and being farther from optical element 5. In FIG. 3, package 1b is not illustrated in order to prevent complexity. The x axis, the y axis, and the z axis will be described later.

Light source device 100 includes light source 1 and optical element 5.

Light source 1 includes a plurality of semiconductor laser elements 1a and package 1b that houses and fixes the plurality of semiconductor laser elements 1a therein.

Optical element 5 includes light transmission part 2, light intensity converter 3, and collimator 4.

Components constituting light source device 100 according to the exemplary embodiment of the present disclosure and functions thereof will be described below with reference to the drawings.

(1) LIGHT SOURCE 1

(1-1) Semiconductor Laser Element 1a

Each of semiconductor laser elements 1a has a multilayer structure. The multilayer structure is formed by stacking a plurality of layers made of a gallium nitride-based semiconductor on a substrate.

Semiconductor laser elements 1a are disposed on package 1b so that the direction perpendicular to the surface of each layer constituting the multilayer structure, that is, the stacking direction, is along the x axis.

When a predetermined voltage is applied to each semiconductor laser element 1a to allow a current to flow therethrough, laser light L is emitted from semiconductor laser element 1a. An emission wavelength of laser light emitted from semiconductor laser element 1a is, for example, a blue wavelength band of 440 nm to 460 nm. In addition, an optical output of semiconductor laser element 1a is, for example, several 10 mW to several 100 mW.

In general, laser light L is emitted at a spread angle due to the shape of an end-face window structure of semiconductor laser element 1a. The present exemplary embodiment describes an example in which laser light L is single transverse mode light, but the effect of the present invention is not limited thereto, and laser light L may be multilateral mode light having a wide stripe structure in which the width of an active layer of the LD is set to be about several 10 microns for higher output. In that case, the optical output of semiconductor laser element 1a is several watts or more.

In FIG. 2 and subsequent drawings, optical axis C indicates the central axis of the light distribution of laser light L.

(1-2) Package 1b

Package 1b has, for example, a rectangular parallelepiped shape with a length of 20 mm, a width of 40 mm, and a height of 15 mm. In FIG. 1 and the subsequent drawings, the horizontal direction of package 1b is defined as the x axis, the vertical direction is defined as the y axis, and the height direction is defined as the z axis. In the present exemplary embodiment, six semiconductor laser elements 1a are equally spaced at predetermined intervals. That is, six semiconductor laser elements 1a are disposed in 3 (x-axis direction)×2 (y-axis direction) array. The interval between two adjacent semiconductor laser elements 1a is 10 mm.

Package 1b is a typical LD package made of aluminum nitride, copper, a metal material plated with gold, tungsten copper, or the like.

(2) OPTICAL ELEMENT 5

Optical element 5 has a rectangular parallelepiped shape with a length of 20 mm, a width of 40 mm, and a height of 3 mm.

(2-1) Light Transmission Part 2

Light transmission part 2 is made of optical glass. Light transmission part 2 has first surface 2a facing light source 1 and second surface 2b opposite to first surface 2a. The thickness of light transmission part 2, that is, the distance from first surface 2a to second surface 2b, is 3 mm. Light intensity converter 3 is formed on first surface 2a of light transmission part 2. Collimator 4 is formed on second surface 2b of light transmission part 2.

(2-2) Light Intensity Converter 3

Light intensity converter 3 includes a plurality of lens arrays 3a disposed on first surface 2a of light transmission part 2. Each lens array 3a is configured to uniformize the light intensity distribution of laser light L (the beam spread of laser light L is indicated by a broken line in FIG. 2) emitted from single semiconductor laser element 1a. Each lens array 3a includes a plurality of lens cells 3b that is two-dimensionally arranged in almost a circle. The size of each lens array 3a is 8.5 mm in diameter. The pitch between adjacent lens cells 3b is 150 μm. The light intensity distribution of laser light L can be uniformized by adjusting the size and curvature of each lens cell 3b. Note that, in light source device 100 according to the present exemplary embodiment, each lens cell 3b is formed into a regular hexagon, and the plurality of lens cells 3b is arranged in a honeycomb shape to form lens array 3a. However, the shape of lens cell 3b is not limited to a regular hexagon. As another shape of lens cell 3b, a regular polygon, for example, a regular triangle, a square, a regular pentagon, or a regular octagon, can also be used. In addition, the other shape of lens cell 3b is not limited to a regular polygon, and other polygons such as a triangle, a quadrangle, a pentagon, and a hexagon can also be used. In addition, the shape of lens cell 3b may be circular or elliptical. Note that, in a case where the shape of lens cell 3b is circular, a non-lens portion is generated between adjacent lens cells 3b even when lens cells 3b are densely arranged, and a component of light (light that does not pass through the lens cell) passing through the non-lens portion in laser light L becomes a factor of inhibiting the uniformity of the intensity distribution. Therefore, the lens cell preferably has an outer shape by which the lens cells can be two-dimensionally arranged without a gap, for example, a regular hexagon, a square, an equilateral triangle, or a rectangle.

(2-3) Collimator 4

Collimator 4 includes a lens array in which a plurality of collimator lenses 4a is two-dimensionally arranged. Each collimator lens 4a is configured to collimate laser light L transmitted through single lens array 3a. The pitch between adjacent collimator lenses 4a is 9.5 mm which is the same as the pitch between semiconductor laser elements 1a. The diameter of collimator lens 4a is 9 mm. Here, collimating means converting light transmitted through collimator lens 4a into parallel light.

Collimator 4 includes six collimator lenses 4a. Six collimator lenses 4a are arranged at equal intervals in 2 (vertical direction)×3 (horizontal direction) array according to six lens arrays 3a.

Note that the region where lens array 3a is provided includes region R (see FIG. 2) through which laser light L passes. The outer peripheral end of lens array 3a is set outside region R. Therefore, the space between lens arrays 3a adjacent to each other on first surface 2a of light transmission part 2 is a flat surface, and lens cell 3b may be present on this flat surface. In other words, lens cell 3b may be disposed on the entire surface of first surface 2a. In this case, lens array 3a is formed in a region including region R and larger than region R.

(3) ARRANGEMENT RELATIONSHIP BETWEEN LIGHT SOURCE 1 AND OPTICAL ELEMENT 5

(3-1) Arrangement Relationship Between Light Source 1 and Optical Element 5 According to Present Disclosure The arrangement relationship between light source 1 and optical element 5 according to the present disclosure will be described below in detail.

Semiconductor laser elements 1a constituting light source 1, lens arrays 3a, and collimator lenses 4a are disposed in one-to-one correspondence. Optical axes C of semiconductor laser elements 1a constituting light source 1 are parallel to the z axis. Optical axes of collimator lenses 4a are parallel to the z axis. Further, a line passing through the center of lens array 3a and parallel to the z axis, the optical axis of collimator lens 4a, and optical axis C coincide with each other.

Figure 4:
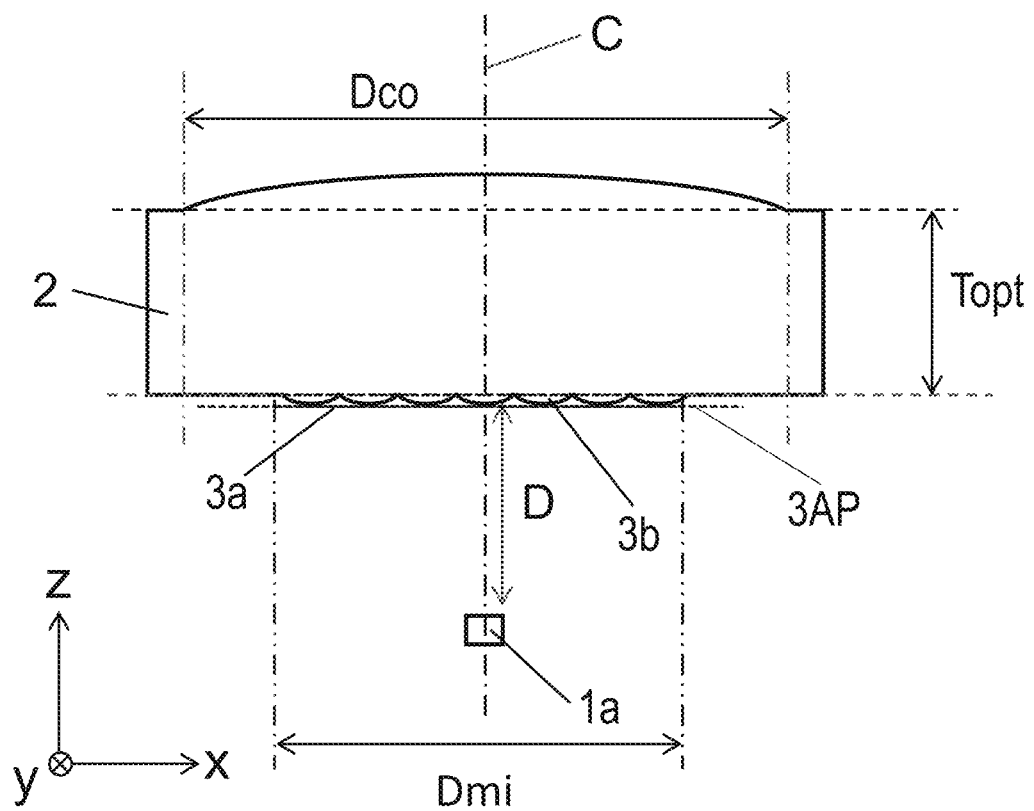

FIG. 4 is a cross-sectional view of light source device 100 taken along the xz plane including line IV-IV passing through the center of one collimator lens 4a and parallel to the x axis in FIG. 3. That is, FIG. 4 is a cross-sectional view illustrating an arrangement relationship among semiconductor laser element 1a, and lens array 3a and one collimator lens 4a which constitute optical element 5. In FIG. 4, package 1b is not illustrated in order to prevent complexity.

Figure 5A:
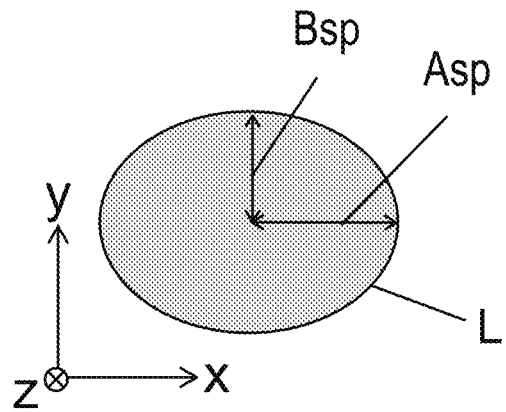
FIG. 5A is a diagram illustrating the size of a laser spot on a plane that is in contact with a lens surface of a lens array when laser light from a semiconductor laser element enters the lens array.
Figure 5B:
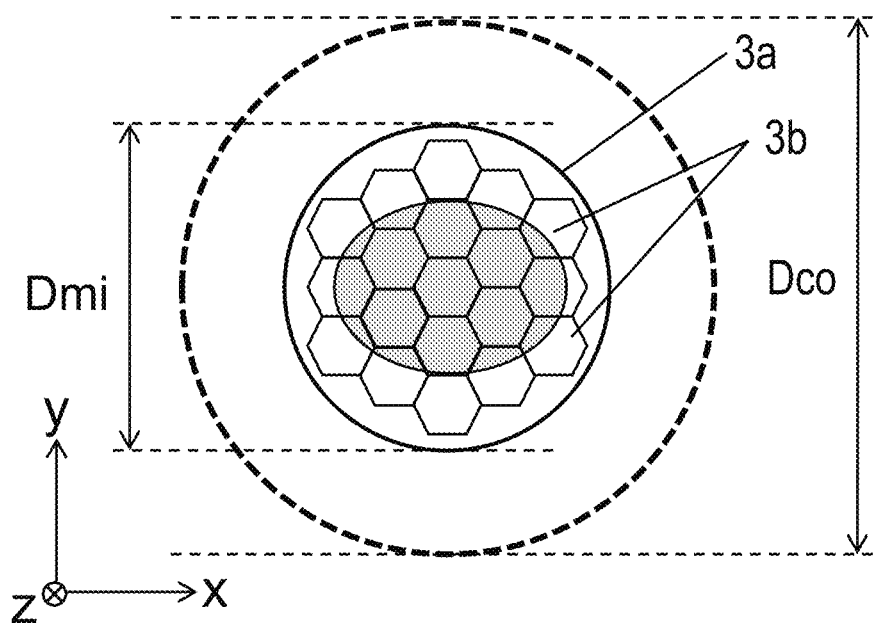
FIG. 5B is a plan view illustrating an arrangement relationship between the lens array and lens cells on the plane that is in contact with the lens surface of the lens array.
Figure 5C:
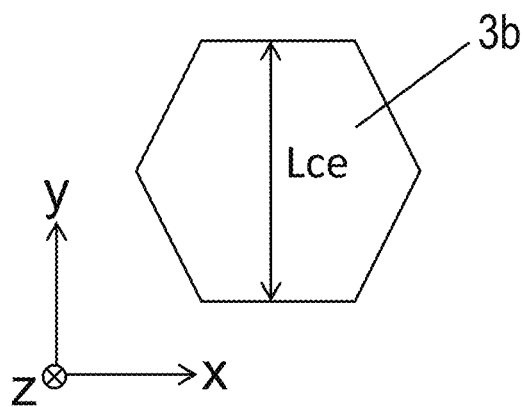
FIG. 5C is a plan view illustrating one lens cell 3b.

FIG. 5A is a plan view illustrating the size of a laser spot on plane 3AP that is in contact with the lens surface of lens array 3a and is parallel to the yz plane when laser light L from semiconductor laser element 1a enters lens array 3a. The laser spot has an elliptical shape. FIG. 5B is a plan view illustrating an arrangement relationship between lens array 3a and lens cells 3b constituting lens array 3a on plane 3AP. FIG. 5C is a plan view illustrating one lens cell 3b.

When the distance between the end surface of semiconductor laser element 1a and the lens surface of lens array 3a is D, D=10 mm is satisfied.

When the diameter of lens array 3a is Dmi, Dmi=8.5 mm is satisfied. Each of lens cells 3b constituting lens array 3a has a regular hexagonal shape in plan view as illustrated in FIG. 5C. The size of lens cell 3b is defined by an interval Lce between two opposing sides of a regular hexagon. In the present exemplary embodiment, Lce=150 μm is satisfied. In addition, the lens surface of lens cell 3b is spherical, and the radius of curvature thereof is 0.7 mm.

When the diameter of collimator lens 4a is Dco, Dco=9 mm is satisfied. The radius of curvature of the lens surface of collimator lens 4a is spherical, and the radius of curvature thereof is 5 cm. That is, the curvature of lens cell 3b is larger than the curvature of collimator lens 4a, and the focal length of lens cell 3b is smaller than the focal length of collimator lens 4a.

When the spread angle of laser light L in the x-axis direction is defined as θ1 and the spread angle in the y-axis direction is defined as θ2, semiconductor laser element 1a studied in the present exemplary embodiment satisfies θ1=23° and θ2=8.5°. Thus, the size of the laser spot on plane 3AP in the x-axis direction is represented by 2×Asp=2×D× tan (θ1)=8.49 mm, and the size in the y-axis direction is represented by 2×Bsp=2×D×tan (θ2)=2.99 mm. The spread angle is an angle (half value) indicating the spread of the beam from optical axis C to a place where the light intensity of laser light L has a value of $1/e^2$ of the peak value (e is the base of the natural logarithm: e=2.718 . . . ).

Note that, as illustrated in FIG. 3, the outer shape of lens array 3a only needs to correspond to the incident laser light, and the outer shape of lens array 3a is preferably within the outer shape of the corresponding collimator lens in top view.

Note that, as illustrated in FIG. 3, the outer shape of lens array 3a only needs to correspond to the incident laser beam, and the outer shape of lens array 3a is preferably within the outer shape of the corresponding collimator lens in top view.
(3-2) Consideration Note that, in light source device 100, the outer dimension (hereinafter referred to as cell size X) of lens array 3a constituting light intensity converter 3 in a front view is an important parameter.

The cross-sectional shape of laser light L emitted from semiconductor laser element 1a and entering light intensity converter 3 is generally elliptical as illustrated in FIG. 5A. The spread angle (half value) of laser light L on the major axis side is defined as θ1, the spread angle (half value) of laser light L on the minor axis side is defined as θ2, and the distance from the emission end surface of semiconductor laser element 1a to light intensity converter 3 is defined as D. In that case, the major axis-side dimension of laser light L incident on light intensity converter 3 is represented by D×tan (θ1), and the minor axis-side dimension is represented by D×tan (θ2).

Diameter Dmi of lens array 3a only needs to have a size including the entire spot of laser light L emitted from semiconductor laser element 1a, and only needs to satisfy Dmi>2×D×tan(θ1).

On the other hand, in order that the light emitted from collimator lens 4a has a flat distribution, it is necessary that laser light L having passed through at least two lens cells 3b are superimposed in substantially the same space. That is, at least the plurality of lens cells 3b needs to be irradiated with the spot of laser light L. To this end, it is necessary to satisfy X<0.5×D×tan (θ2).

Therefore, it is preferable that diameter Dmi of one lens array 3a satisfies at least Dmi≥2×D×tan(θ1), and cell size X of one lens cell 3b satisfies X≤0.5×D×tan(θ2).

When lens cell 3b is a regular hexagon, X=Lce is satisfied.

Practically, light source device 100 is desirably designed in such a manner that laser light L emitted from single semiconductor laser element 1a passes through three or more lens cells 3b, and in this case, the cross-sectional light intensity distribution of the emitted light at a desired position is uniformized with a variation of 15% or less. Light source device 100 can be designed and fabricated so that the ratio between cell size X and the minor axis-side dimension of the incident light beam increases due to the uniformity of the light intensity distribution desired according to use purposes.

Note that diameter Dmi of lens array 3a only needs to have a size including the entire spot of laser light L emitted from semiconductor laser element 1a, and only needs to satisfy Dmi>2×D×tan(θ1). In addition, regarding the size of lens cell 3b, at least the plurality of lens cells 3b needs to be irradiated with the spot of laser light L in order that the light emitted from collimator lens 4a has a flat distribution. To this end, it is necessary to satisfy Lce<0.5×D×tan(θ2).

In the present exemplary embodiment, Dmi=8.5 mm and 2×D×tan(θ1)=8.49 mm are satisfied, and thus, the above relational expression is satisfied. In addition, Lce=150 μm=0.15 mm and 0.5×D×tan(θ2)=0.75 mm, and thus, the above relational expression is satisfied.

(4) CHARACTERISTICS OF LIGHT SOURCE DEVICE 100

Figure 6:
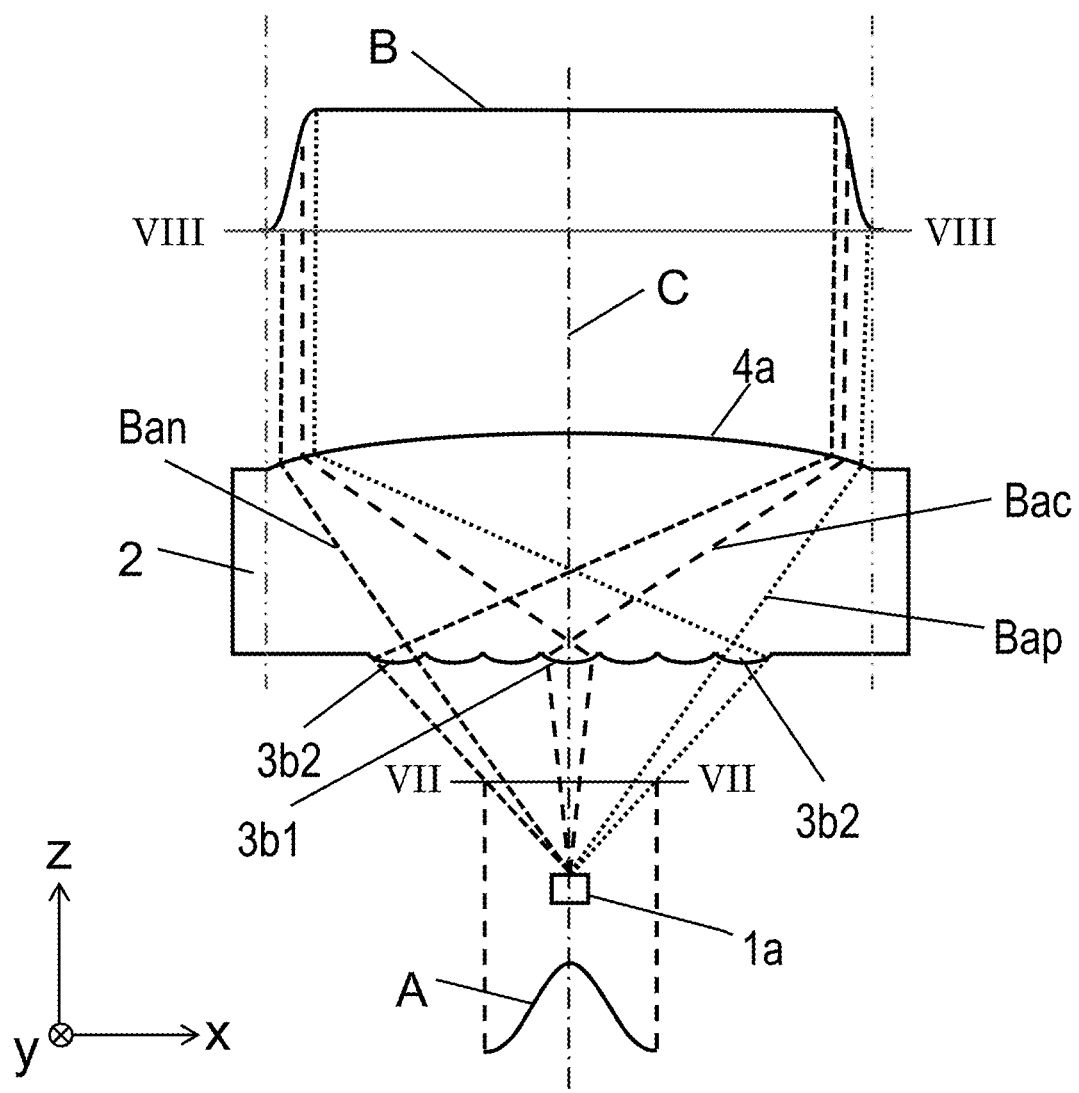
FIG. 6 is a schematic cross-sectional diagram illustrating how the light intensity distribution of laser light emitted from the semiconductor laser element is uniformized after the laser light passes through the collimator lens in the arrangement of the semiconductor laser element, the lens array, and the collimator lens.

FIG. 6 is a schematic cross-sectional diagram illustrating a theory in which the light intensity distribution of laser light L emitted from semiconductor laser element 1a is uniformized in the arrangement, illustrated in FIG. 4, of semiconductor laser element 1a and lens array 3a and one collimator lens 4a which constitute optical element 5.

Graph A illustrated in FIG. 6 indicates a light intensity distribution (far-field light distribution in the x-axis direction) of laser light L at line segment VII-VII parallel to the x axis between semiconductor laser element 1a and light intensity converter 3. Graph B in FIG. 6 indicates a light intensity distribution of laser light L at line segment VIII-VIII parallel to the x axis after laser light L is emitted from collimator 4.

Figure 7:
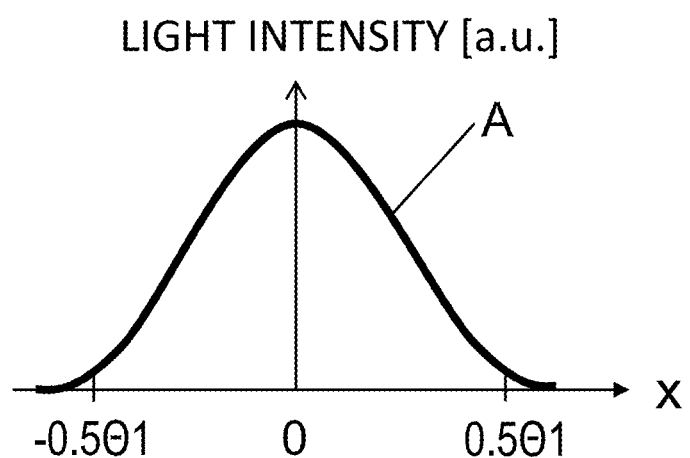
FIG. 7 is a diagram illustrating a far-field light intensity distribution of laser light immediately after the laser light is emitted from the semiconductor laser element.
Figure 8:
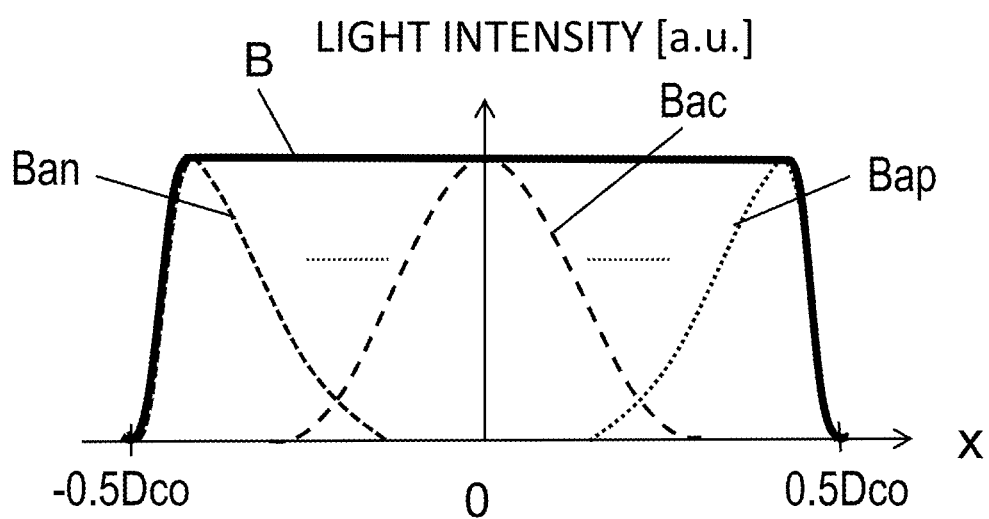
FIG. 8 is a diagram illustrating a light intensity distribution after laser light emitted from the semiconductor laser element passes through the collimator lens.

FIG. 7 is a diagram illustrating a far-field light intensity distribution in the x-axis direction of laser light L emitted from semiconductor laser element 1a at position VII-VII. The graph of the light intensity distribution illustrated in FIG. 7 is the same as graph A in FIG. 6. FIG. 8 is a diagram illustrating a light intensity distribution in the x-axis direction at position VIII-VIII after laser light L is emitted from collimator lens 4a. The graph of the light intensity distribution illustrated in FIG. 8 is the same as graph B in FIG. 6.

The light intensity distribution of laser light L incident on lens array 3a is a Gaussian distribution as illustrated in graph A. Laser light L incident on lens array 3a separately enters a plurality of lens cells 3b. Laser light L incident on the lens cells 3b is condensed and then diverged. For example, laser light L in a region in the vicinity of optical axis C having a large light intensity distribution is diverged to substantially entire collimator lens 4a by lens cell 3b1. Laser light L in a region in the vicinity of outer periphery having a low light intensity distribution is diverged to substantially entire collimator lens 4a by lens cell 3b2. That is, the light intensity distribution of laser light L emitted from collimator lens 4a is formed as an image obtained by superimposing laser light beams L diverged by lens cells 3b. As a result, the light intensity distribution of laser light L emitted from collimator lens 4a is uniformized as illustrated in graph B.

Light source device 100 according to the present disclosure is characterized in that light intensity converter 3 is integrally formed on the first surface of light transmission part 2, and collimator 4 is integrally formed on the second surface of the light transmission part. In light source device 100, light intensity converter 3 is formed on first surface 2a of light transmission part 2. That is, light intensity converter 3 is disposed at a place where laser light L emitted from semiconductor laser element 1a spreads with a predetermined spread angle. In this configuration, the optical path length of an optical system including light source 1, light intensity converter 3, and collimator 4 can be shortened as compared with a device configuration in which light intensity conversion is performed after laser light L is collimated. That is, the size of the optical system in light source device 100 can be reduced.

(5) METHOD FOR MANUFACTURING LIGHT TRANSMISSION PART 2

Light transmission part 2 using optical glass can be manufactured by a glass molding process using a press mold. As the press mold, a precisely machined super-steel mold is used. As a material of the super-steel mold, tungsten carbide is used, for example.

The glass molding process has a degree of freedom of a processed shape of a mold and a degree of freedom of a shape of a preform glass material. As a result, it is possible to achieve a press mold for transferring collimator lens 4a which requires a large sag amount and lens array 3a having fine dimensions. Here, the sag amount refers to an excavating amount with respect to a processed surface of the mold.

The required beam quality (aberration characteristics and condensing performance) level of laser light used as excitation light of a light source for a projector or a phosphor is lower than the beam quality level of laser light used in an optical disk device or the like. Therefore, regarding the shape accuracy of a lens, a variation of, for example, about 5 µm to 10 µm is allowed, and there is also an advantage that it is possible to manufacture a mold at low cost by reducing a number of processing tools and processing steps in mold processing. Examples of optical glass suitable for the glass molding process include BSL7 which is a product of OHARA Inc., and PBK40 which is a product of Sumita Optical Glass Inc.

On the other hand, the super-steel mold requires time to process the molding surface to which lens array 3a and collimator lens 4a are transferred. That is, the processing amount and the processing cost are proportional to each other. In other words, in order to reduce the mold cost, it is important to reduce the processing area of the press mold. Therefore, it is preferable that a space between adjacent lens arrays 3a is flat as illustrated in FIGS. 1 and 2. That is, disposing light intensity converter 3 in a diffusion path of laser light L as described above enables significant miniaturization of lens array 3a. Thus, the processing cost of the press mold can be reduced.

In addition, for example, when the lens curvature of lens cell 3b is increased (the lens curvature radius is decreased) or cell size X is increased, an amount of projection of the lens (the depth of the lens, commonly referred to as a sag amount of the lens) is increased. In such a case, a problem may occur in the lens molding process by the glass molding process. In particular, when the surface of a preform glass material on which light intensity converter 3 is to be formed is substantially flat, a space formed between the cell boundary (ridge line) of the press mold for transferring lens array 3a and the preform glass material is nearly closed. As a result, a phenomenon called "air trap" in which the transfer portion is not sufficiently filled with glass easily occurs. This phenomenon is more notable as the sag amount of lens cell 3b is larger. However, it has been confirmed that, when the sag amount is smaller than about 15 microns, molding in which such a phenomenon hardly occurs can be performed by appropriately selecting process conditions such as temperature and pressure. Therefore, in order to ensure high mass productivity and yield, the sag amount of lens cell 3b is preferably 15 microns or less. In addition, a decrease in the sag amount also provides an advantage that it is possible to reduce the number of steps related to mold processing and cost for producing the mold. Furthermore, a decrease in the sag amount enables a reduction in transmission loss of light at the boundary (ridge line) of lens cells 3b, and thus, use efficiency of laser light L emitted from semiconductor laser element 1a can be increased.

((6) MODIFICATIONS

Note that the number of semiconductor laser elements 1a constituting light source 1 is not limited to six. In addition, regarding the arrangement of the plurality of semiconductor laser elements 1a, the number of rows is not limited to the above-described number. That is, the plurality of semiconductor laser elements 1a constituting light source 1 is arranged in one-dimensional or two-dimensional array. In addition, lens arrays 3a and collimator lenses 4a are also arranged, as appropriate, according to the arrangement of semiconductor laser elements 1a.

Figure 9:
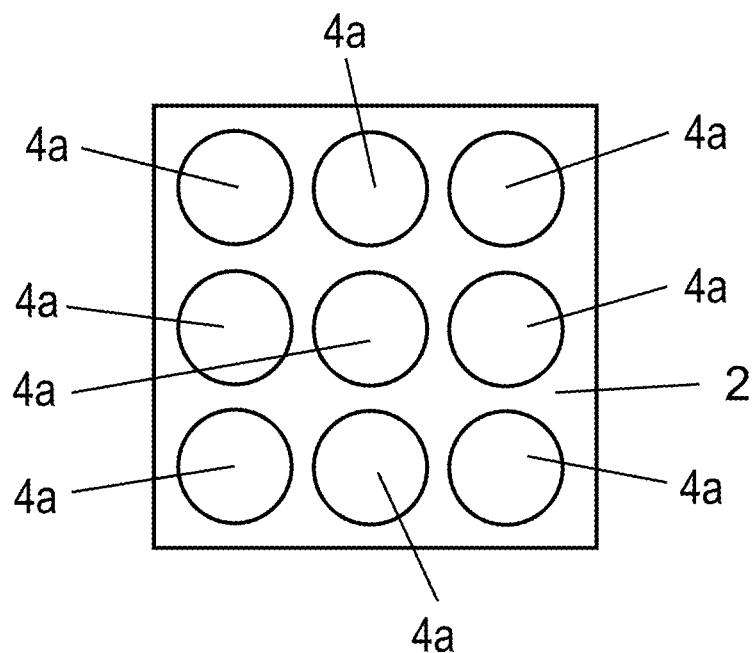
FIG. 9 is a plan view illustrating one example of an optical element of a light source device according to a modification of the present disclosure.
Figure 10:
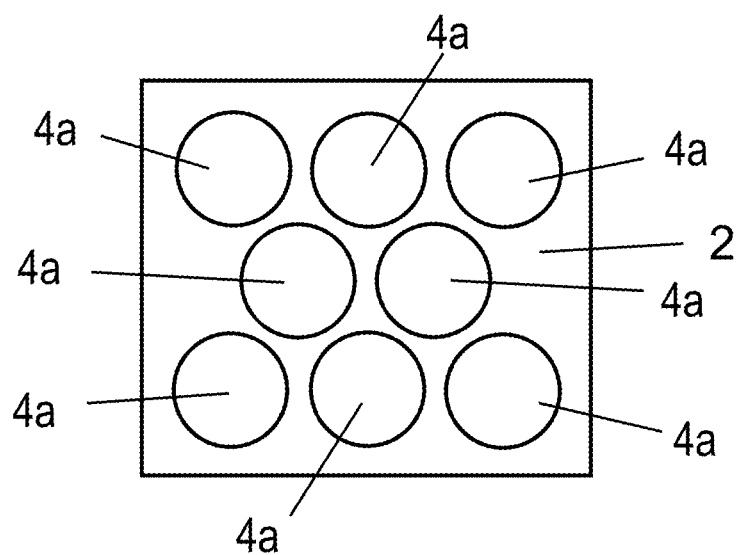
FIG. 10 is a plan view illustrating another example of the optical element of the light source device.

For example, 3 (vertical)×3 (horizontal) collimator lenses 4a may be arranged at equal intervals as illustrated in FIG. 9. In addition, as illustrated in FIG. 10, a plurality of collimator lenses 4a may be arrayed so that adjacent three collimator lenses 4a are arranged in an equilateral triangle. In addition to the arrangement illustrated in FIGS. 9 and 10, collimator lenses 4a may be arranged in a rectangle or in a polygon such as a pentagon or a hexagon. Furthermore, collimator lenses 4a may be arranged in a circle or an ellipse.

In FIGS. 9 and 10, lens arrays 3a are not illustrated in order to avoid complexity.

(7) OTHER CONFIGURATIONS

In the exemplary embodiment described above, the pitch between adjacent lens cells 3b is set to 150 µm, but the pitch is not limited thereto, and may be 50 µm or more and 500 µm or less.

In the above exemplary embodiment, the pitch between collimator lenses 4a adjacent to each other is 9.5 mm. However, the pitch is not limited thereto, and may be 2 mm or more and 10 mm or less.

In the above exemplary embodiment, the thickness of light transmission part 2 is set to 3 mm, but the thickness is not limited thereto, and may be 1 mm or more and 5 mm or less.

Although FIG. 2 illustrates the configuration in which light transmission part 2 is disposed in the emission direction of laser light L from semiconductor laser elements 1a, a deflection element such as a prism mirror may be disposed between semiconductor laser elements 1a and light transmission part 2 to form a non-linear optical path.

(8) WHITE LIGHT SOURCE

Figure 11:
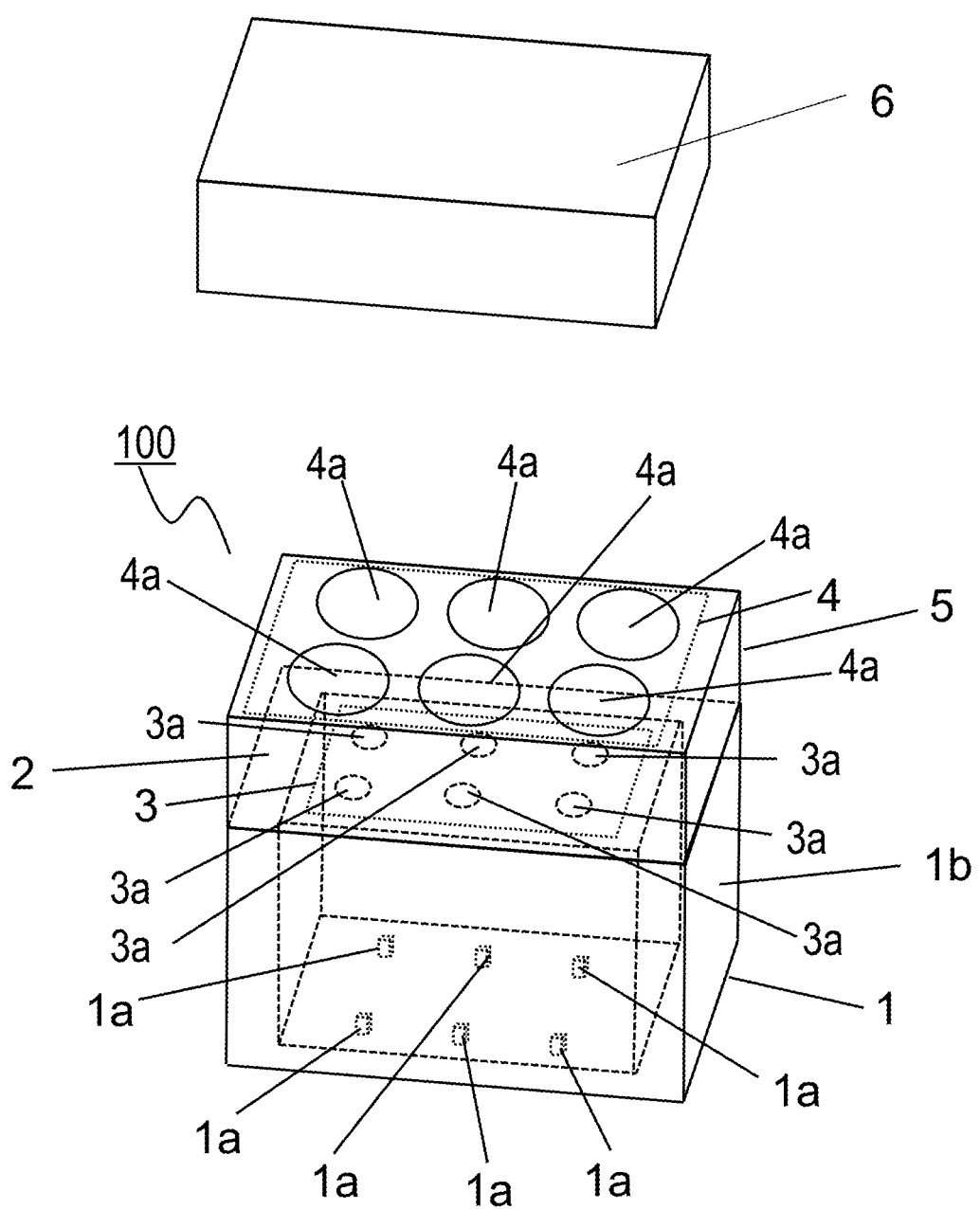
FIG. 11 is a schematic diagram of a white light source using the light source device according to the present disclosure.

FIG. 11 schematically illustrates a white light source using the light source device according to the present disclosure.

In FIG. 11, phosphor layer 6 is disposed above light source device 100. Phosphor layer 6 contains, for example, a YAG phosphor therein. The light source device can obtain white light from phosphor layer 6 by irradiating phosphor layer 6 with light from light source device 100.

Examples of the phosphor contained in phosphor layer 6 include a SIALON phosphor besides YAG.

Although a semiconductor laser that emits blue light is used as semiconductor laser element 1a in the above exemplary embodiment, the configuration is not limited thereto, and a semiconductor laser that emits ultraviolet light may be used.

A component that has not been converted into fluorescent light in laser light L that has passed through phosphor layer 6 is disturbed in phase due to diffuse reflection or the like in phosphor layer 6, and coherence is reduced. Therefore, speckle noise of light source device 100 is reduced.

In addition, speckle noise of light source device 100 can be reduced by setting the emission wavelengths of the plurality of semiconductor laser elements 1a disposed in package 1b to be slightly different from each other.

(9) ASPECTS

Aspects of the present disclosure will be described below.

Light source device 100 according to a first aspect of the present disclosure includes light source 1 and optical element 5. Light source 1 emits laser light L. Optical element 5 is disposed in an emission direction of laser light L. Light source 1 includes a plurality of semiconductor laser elements 1a. Each of the plurality of semiconductor laser elements 1a emits laser light L. Optical element 5 has first surface 2a and second surface 2b. First surface 2a includes light intensity converter 3. Laser light L enters light intensity converter 3. Light transmission part 2 is provided between first surface 2a and second surface 2b. Laser light L is transmitted through light transmission part 2. Second surface 2b has collimator 4. Laser light L having transmitted through light intensity converter 3 is emitted to collimator 4. Light intensity converter 3 includes a plurality of lens arrays 3a. Collimator 4 includes a plurality of collimator lenses 4a. Laser light L emitted from predetermined one semiconductor laser element 1a among the plurality of semiconductor laser elements 1a enters predetermined one lens array 3a among the plurality of lens arrays 3a. Laser light L entering predetermined one lens array 3a is transmitted through predetermined one collimator lens 4a among the plurality of collimator lenses 4a and emitted. Each of the plurality of lens arrays 3a has a plurality of lens cells 3b. Laser light L is transmitted through at least two lens cells 3b among the plurality of lens cells 3b included in predetermined one lens array 3a. Laser light L transmitted through at least two lens cells 3b has a uniform light intensity distribution. Laser light L has a parallel light flux after passing through predetermined one collimator lens 4a.

In light source device 100 according to a second aspect of the present disclosure, in the first aspect, predetermined one semiconductor laser element 1a, predetermined one lens array 3a, and predetermined one collimator lens 4a are disposed on optical axis C of laser light L.

In light source device 100 according to a third aspect of the present disclosure, in the first aspect, outer shapes of lens arrays 3a are located inside outer shapes of collimator lenses 4a when optical element 5 is viewed from above.

In light source device 100 according to a fourth aspect of the present disclosure, in the first aspect, each of lens cells 3b has a sag amount of 15 µm or less.

As described above, in light source device 100 according to the present disclosure, the optical system can be reduced in size by placing a plurality of light sources in one small package 1b.

The present disclosure has an effect of providing a plurality of collimated laser beams having uniform intensity distribution with a small number of components, and is effectively used for laser projectors and laser illumination that require a compact optical system with high light use efficiency.

The invention claimed is:

1. A light source device comprising:
a light source that emits laser light; and
an optical element that is disposed in an emission direction of the laser light, wherein:
the optical element is integrally formed from optical glass,
the light source includes a plurality of semiconductor laser elements that emit the laser light,
the optical element includes:
a first surface,
a second surface,
a light intensity converter integrally formed from the optical glass on the first surface, wherein the laser light enters the light intensity converter,
a light transmission part between the first surface and the second surface, wherein the light transmission part transmits the laser light, and
a collimator integrally formed from the optical glass on the second surface, wherein the collimator emits the laser light having transmitted through the light intensity converter,
the light intensity converter includes a plurality of lens arrays,
each of the plurality of lens arrays comprises a plurality of lens cells,
the collimator includes a plurality of collimator lenses,
the laser light emitted from a predetermined one semiconductor laser element among the plurality of semiconductor laser elements (1) enters a predetermined one lens array among the plurality of lens arrays, (2) is transmitted through a predetermined one collimator lens among the plurality of collimator lenses, and (3) is emitted,
the laser light entering the predetermined one lens array is transmitted through at least two lens cells among the plurality of lens cells included in the predetermined one lens array,
the laser light transmitted through the at least two lens cells comprises a uniform light intensity distribution, and
the laser light has a parallel light flux by passing through the predetermined one collimator lens.

2. The light source device according to claim 1, wherein the predetermined one lens array and the predetermined one collimator lens are disposed on an optical axis of the predetermined one semiconductor laser element.

3. The light source device according to claim 1, wherein, when the optical element is viewed from above, an outer shape of each of the plurality of lens arrays is located inside an outer shape of a corresponding one of the plurality of collimator lenses.

4. The light source device according to claim 1, wherein each of the plurality of lens cells has a sag amount of 15 µm or less.

5. The light source device according to claim 1, wherein a spacing between adjacent lens arrays of the plurality of lens arrays is larger than a spacing between adjacent lens cells of the plurality of lens cells.

6. The light source device according to claim 1, wherein:
when the optical element is viewed from above, an outer shape of each of the plurality of lens arrays is circular, and a diameter Dmi of each of the plurality of lens arrays satisfies a following relationship:

$$Dmi > 2 \times D \times \theta 1$$

where D represents a distance between an end face of each of the plurality of semiconductor laser elements and a lens surface of each of the plurality of lens arrays, and θ1 represents a spread angle of the laser light in a direction perpendicular to an optical axis of the predetermined one semiconductor laser element.

* * * * *